Patented Mar. 10, 1925.

1,529,431

UNITED STATES PATENT OFFICE.

AAGE GUSMER, OF EAST ORANGE, NEW JERSEY.

BEVERAGE.

No Drawing.   Application filed December 24, 1919.   Serial No. 347,137.

*To all whom it may concern:*

Be it known that I, AAGE GUSMER, a subject of the King of Denmark, and a resident of city of East Orange, State of New Jersey, have invented certain new and useful Improvements in Beverages, of which the following is a description.

This invention relates to beverages and has for its primary object to provide a new and inexpensive process of manufacturing beverages from fruit or vegetable juices which will be wholesome, palatable and health promoting.

In my copending application filed July 2, 1918, Serial No. 243,062, I have described and claimed a beverage and a certain process of producing the same wherein fruit pulp is subjected to diffusion with water at a normal temperature. In such process, it was found that the starchy and albuminous constituents of the pulp were dissolved and together with portions of the pectose matters carried into the solution of water and fruit juices which were run off from the pulp. It was therefore necessary to add to the solution a diastatic enzym such as malt extract in order to convert the starch into sugar. Such an enzym however had little effect upon the albuminous and pectose matters so that the beverage was somewhat turbid, particularly when subjected to pasteurization which is more or less necessary in order to prevent fermentation when a non-alcoholic beverage is desired. I have found that this turbidity of the beverage may be eliminated by diffusing the fruit or vegetable pulp to extract the juices therefrom, with water as near the freezing point as it is possible to maintain without solidification, instead of hot water, or water at a normal temperature as heretofore employed.

In carrying out my process, I preferably use dried fruits, such for instance, as dried apples, though I may likewise use apple waste or chops which usually consists of the cores and peels and cull apples,—that is apples of inferior grade which are unmarketable. It has been a common practice to use such apple waste or chops in the manufacture of jellies and vinegar. I place the dried fruit in a large vat having a false bottom which is perforated. The mass is then subjected for a period of about twelve hours to a thorough soaking in water which is kept at a temperature as near to the freezing point as possible. The fruit pulp is thus caused to expand and release the juice and the malic acids. The solution containing the extracted juices is finally run off through the perforated bottom of the vat. The fruit pulp is then subjected to further diffusions with water at the same low temperature and such further charges of water removed with the subsequent extractions and added to the first solution.

By the use of water artificially cooled to a very low temperature the albuminoids in the fruit pulp will not dissolve and be carried into the solution. I have also found that the pectineus matters in the cells of the fruit pulp will remain. In the use of hot water the albuminoids are dissolved and the pectineus matters released and carried off with the solution, and subsequently are precipitated in the beverage. Tannic starch also dissolves in hot water or water at a normal temperature as used in my process disclosed in the application above referred to. Notwithstanding the elimination of the starch by the use of the diastase which converts the starch into sugar, the beverage will be rendered cloudy or turbid by the albuminoids and pectineus matters when the hot water is used. As above stated in the use of water of a low temperature, the fruit juices and acids are extracted but the albuminoids and starch will not be dissolved but will remain in the fruit pulp. The pectin also remains in the pulp and may be extracted therefrom and used in the manufacture of jellies. Thus by means of my new process I obtain a beverage which is perfectly free from cloudiness or turbidity and in which it is not necessary to use an enzym for the purpose of preventing the precipitation of the albuminous or starchy matters which would be extracted from the fruit pulp if hot water or water at a normal temperature were employed. Also by the use of water of very low temperature there is considerably less danger of fermentation of the fruit juices than when a water of relatively high temperature is used.

From the above description the nature of my improved beverage and the process for producing the same will be fully understood. While I preferably use dried fruits, fresh fruits may be treated in a similar manner and with the same advantageous results. It is also to be understood that the invention is not to be limited to the use of apples, as a desirable beverage may also be prepared from various other fruits and vegetables.

I claim:

The herein described process which consists in subjecting vegetable pulp to diffusion with water reduced to a temperature as near the freezing point as possible to thereby prevent the separation of the pectin from the pulp and to prevent the dissolution of the albuminous and starchy constituents thereof while extracting the juices.

In testimony that I claim the foregoing as my invention, I have signed my name hereunder.

AAGE GUSMER.